United States Patent

He

(10) Patent No.: US 9,471,812 B2
(45) Date of Patent: Oct. 18, 2016

(54) METHOD FOR IMPLEMENTING SECURITY OF NON-VOLATILE MEMORY

(75) Inventor: Chen He, Austin, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 289 days.

(21) Appl. No.: 13/413,162

(22) Filed: Mar. 6, 2012

(65) Prior Publication Data

US 2013/0238831 A1 Sep. 12, 2013

(51) Int. Cl.
G06F 12/00 (2006.01)
G06F 12/02 (2006.01)
G06F 21/79 (2013.01)
G06F 21/74 (2013.01)
G06F 12/14 (2006.01)

(52) U.S. Cl.
CPC ............ *G06F 21/79* (2013.01); *G06F 12/00* (2013.01); *G06F 12/0246* (2013.01); *G06F 12/1441* (2013.01); *G06F 21/74* (2013.01)

(58) Field of Classification Search
CPC ......... G06F 21/79; G06F 12/14; G06F 12/00
USPC ......................................... 711/163, 164, 103
See application file for complete search history.

(56) References Cited

U.S. PATENT DOCUMENTS

| | | | |
|---|---|---|---|
| 5,377,264 A | 12/1994 | Lee et al. | |
| 5,432,950 A | 7/1995 | Sibigtroth | |
| 5,771,348 A | 6/1998 | Kubatzki et al. | |
| 7,757,295 B1* | 7/2010 | Hadaegh | 726/26 |
| 2004/0243823 A1* | 12/2004 | Moyer et al. | 713/200 |
| 2007/0157000 A1* | 7/2007 | Qawami et al. | 711/170 |
| 2008/0086780 A1 | 4/2008 | Chen et al. | |
| 2009/0007275 A1* | 1/2009 | Gehrmann | G06F 21/445 726/27 |
| 2009/0113114 A1* | 4/2009 | Berenbaum et al. | 711/103 |
| 2011/0082966 A1* | 4/2011 | Yu | G06F 12/1408 711/103 |
| 2011/0179215 A1* | 7/2011 | Zitlaw et al. | 711/103 |
| 2011/0258462 A1* | 10/2011 | Robertson et al. | 713/193 |

OTHER PUBLICATIONS

Intel, "Intel StrataFlash(r) Embedded Memory (P30): 1-Gbit P30 Family," Datasheet; Order No. 306666, Revision: 004; Nov. 1, 2005, 107 pages.

* cited by examiner

*Primary Examiner* — Yaima Rigol
*Assistant Examiner* — Gautam Sain

(57) ABSTRACT

An integrated circuit includes a non-volatile memory module that can censor access to various memory regions based upon a censorship criteria. Information used to implement the censorship criteria is stored at a non-volatile memory location. A one-time programmable non-volatile memory location stores a value representing permanent censorship key. If the permanent censorship key is in an erased state, one or more resources are allowed to modify the non-volatile memory location and disable censorship. If the permanent censorship key has one or more programmed bits, no resource is allowed to modify the non-volatile memory location and disable censorship.

17 Claims, 4 Drawing Sheets

METHOD FOR IMPLEMENTING SECURITY OF NON-VOLATILE MEMORY

BACKGROUND

1. Field of the Disclosure

The present disclosure relates generally to electronic devices, and more particularly to electronic devices including non-volatile memory.

2. Description of the Related Art

The ability to prevent certain information stored in non-volatile memory (NVM) from being accessed to read, erase or program content is desirable in order to protect intellectual property and to insure integrity of such data. Protection of such information when an NVM is integrated onto an integrated circuit that includes one or more peripherals and one or more data processors, is also desirable. Many microcontrollers implement a censorship logic which requires a public censorship control word to be programmed in a special NVM block to keep the device uncensored so that external accesses to the NVM are allowed. Once the censorship control word location is altered, e.g., by erasing and programming the NVM block that stores the censorship control word, and a proprietary password is provided, the device will be censored and the NVM will not be accessible externally, e.g., via a debug interface, without knowing the proprietary password and hence the content and integrity of the NVM's contents is protected.

BRIEF DESCRIPTION OF THE DRAWINGS

The present disclosure may be better understood, and its numerous features and advantages made apparent to those skilled in the art by referencing the accompanying drawings.

DETAILED DESCRIPTION

An integrated circuit includes a non-volatile memory (NVM) module that can censor access to various memory regions based upon a censorship criteria. Censorship control information that is used to indicate a current set of censorship criteria is stored at a non-volatile memory location that is erasable/programmable. A one-time programmable (OTP) non-volatile memory location stores a value representing permanent censorship key. If the permanent censorship key is in an erased state, one or more resources are allowed to erase and program the non-volatile memory location that is used to implement the censorship criteria; and thus can disable censorship. If the permanent censorship key has one or more programmed bits, no resources are allowed to erase and program the non-volatile memory location that is used to implement the censorship criteria, and, therefore, cannot disable censorship. The use of the permanent censorship key prevents resources that would otherwise be allowed to modify censorship control information from doing so. The ability to prevent the censorship control information from being modified can address concerns that hacker code embedded in complex application code may exist that could be used to erase the NVM block where the censorship control information is stored and program this control information back to the public censorship control word, thereby maliciously unsecuring the device. Specific implementations of the present disclosure will be better understood with reference to FIGS. 1 through 5.

Figure 1:
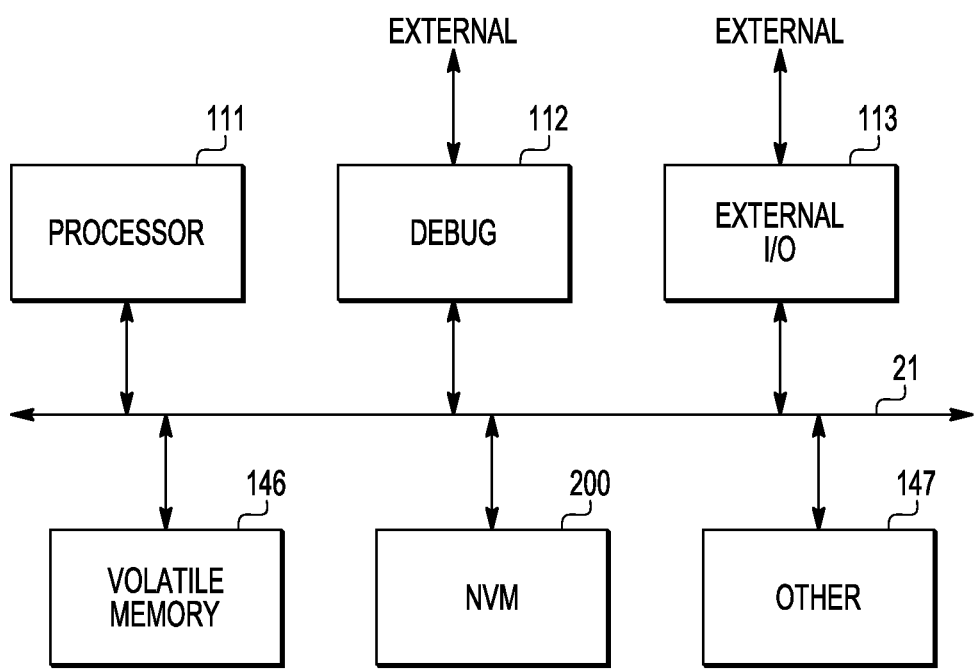
FIG. 1 illustrates, in block diagram form, an integrated circuit in accordance with one embodiment.

FIG. 1 illustrates, in block diagram form, an integrated circuit 100 in accordance with one embodiment. In the illustrated embodiment, integrated circuit (IC) 100 includes one or more processors 111, a debug module 112, an external IO module 113, one or more NVM modules 200, one or more other volatile memories 146, one or more other modules 147, which are connected via an appropriate interface 21, such as a bus or the like, with multiple signals or bits. Alternate embodiments may not have a processor 111, may not have a debug module 112, may not have other memory 146, may not have other modules 147, and/or may not have external IO module 113. Conversely, alternate embodiment may have additional modules.

For purposes of discussion, it is presumed that the processor 111 is a general purpose processor that can fetch and execute instructions and data from either the volatile memory module 146 or from the NVM 200.

The debug module 112 is used to communicate information between the integrated circuit 100 and an external debug device (not shown) via an external debug interface in order to provide the ability to access and modify state information of IC 100 in order to debug customer specific applications. Similarly, external IO 113 is connected to an external interface through which information can be communicated between the IC 100 and an external device. Note that debug module 112 and external IO module 113 are examples of external modules that are not considered to be as secure as processor 111, which is referred to as an internal module in that it does not have an external interface, or is otherwise considered more secure than the external modules. Therefore, the processor 111 is considered an internal resource that can always fetch code and data from NVM 200 for processing, while debug module 112 and external IO module 113 are considered external resource whose access to NVM is scrutinized by censorship logic of the NVM 200.

Figure 2:
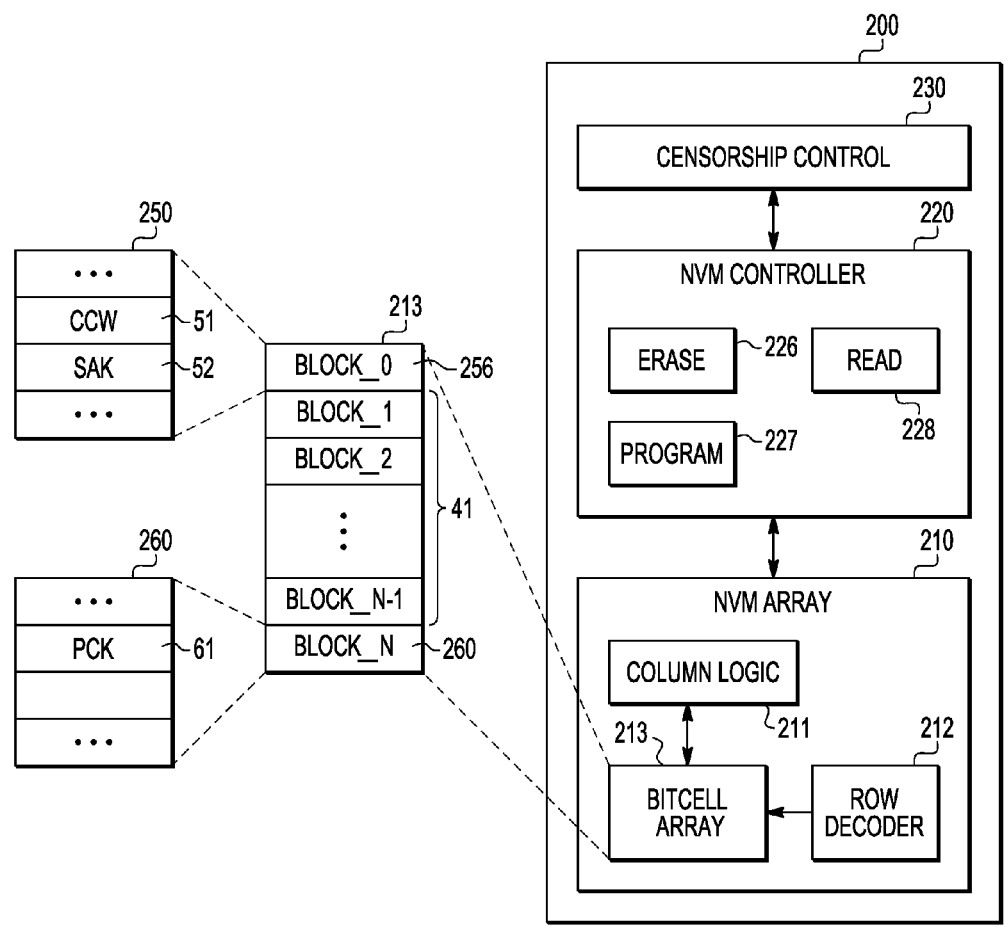
FIG. 2 illustrates, in block diagram form, an NVM module of FIG. 1 in accordance with one embodiment.

FIG. 2 illustrates a particular embodiment of NVM module 200. In the specific embodiment illustrated, the NVM module 200 is illustrated to have a censorship control module 230, an NVM controller module 220, and an NVM array module 210. According to the specific embodiment illustrated, the NVM array module 210 includes a NVM bitcell array 213, a column logic module 211 and a row decode module 212. The column logic 211 incorporates a column decoder and sense amplifiers (not shown). The NVM controller 220 controls operation of the NVM array 213 through the row decoder 212 and the column logic 211, such as in response to the processor(s) 111 as communicated through the bus interface 21 or other interfaces. For example, the NVM controller 220 controls accesses to memory cells within the bitcell array 213 by providing a row address to the row decoder 212 and a column address to the column logic 211. Data is written into, e.g., for programming, or read from the NVM array 213 via the column logic 211. The NVM bitcell array 213 is implemented as a number of memory blocks, including: a set of programmable and erasable blocks 41 for normal usage, a special programmable and erasable block 250, also referred to as a shadow block, and a one-time-programmable (OTP) block 260.

The shadow block 250 is used to store various control information, such as the censorship control word (CCW) 51 and the secure access key (SAK) 52. The OTP block 260 stores various control information such configuration information related to the IC 100, and a permanent censorship key (PCK). Upon receiving an access request at the non-volatile memory module 200, the censorship control module 230 determines whether or not the access request is valid. For example, the censorship control module 230 determines if a given access request is subject to being censored based upon the state of CCW 51. If the state of CCW 51 indicates that the current access request is not subject to being censored the request is validated and subject to further processing. If, however, the state of CCW 51 indicates that the current access request is subject to being censored, the censorship control module 230 will determine if the current access request is to be authenticated based upon the secure access key (SAK) 52. If authenticated based upon SAK 52, the request is validated and allowed to continue. If not authenticated by SAK 52, the censorship control module 230 prevents the access request from being completed.

According to a particular embodiment, an access request that is to be censored can be authenticated by comparing a password provided by the user to the value stored at SAK 52. In one embodiment, the password is provided by the user during an initial boot routine of the IC 100 from the external IO module 113, during which the user provided value is compared to the value at SAK 52. In other embodiments, the provided password is provided with each individual access request for authentication. If the value stored at SAK 52 matches the proprietary password, the censorship control module 230 will validate the request thereby allowing it to proceed. If the stored proprietary password does not match the provided proprietary password, the request is censored. In another embodiment, the censorship control module 230 can be outside the NVM module 200 but inside a separate NVM bus interface unit (BIU) module (not shown).

While the values stored at SAK 52 and or CCW 51 can be set to prevent contents of the NVM from being accessed by external devices, it may be possible for internal resources to change the states of SAK 52 and or CCW 51 in such a manner as to disable the censorship feature. In some configurations of IC 100, the ability of an internal resource to change the states of SAK 52 and or CCW 51 may be desirable. While in other configurations, the ability of an internal resource to change the states of SAK 52 and or CCW 51 may be undesirable.

In order to prevent the values of the CCW 51 and SAK 52 from being changed by any resource, such as an internal resource, a value of a permanent censorship key (PCK) is stored at OTP location PCK 61 that indicates whether the NVM block containing CCW 51 and PPW 52 are subject to being erased or programmed. In accordance with a specific embodiment of the present disclosure, PCK is a multi-bit value, such as a 64-bit word, that has a logic value that reflects the erased logic state of PCK 61. Other embodiments can include PCK 61 having more or fewer numbers of bits, such as 16-bits or more, 32-bits or more, and the like. In response to any one or more bits of PCK 61 being subsequently programmed, e.g., one or more memory cells of PCK 61 are in a programmed state, the NVM controller module 220 will not allow CCW 51 and SAK 52 to be erased or programmed. In this manner, it is possible to prevent resources which would otherwise be authorized to erase or program the values of CCW 51 and SAK 52 from doing so, thereby providing an additional level of security.

According to the embodiment described herein, access requests that are validated by the censorship control module 230 are further processed by NVM controller 220, which in turn provides lower-level access request information to the NVM array module 210. The NVM controller module 220 is illustrated to have a plurality of modules that handle various access types, respectively. For example, a read control module 228 handles read access request (read requests), an erase control module 226 handles erase access requests (erase requests), and a program control module 227 handles program access requests (program requests). In another embodiment, the NVM controller 220 can be one module that handles all types of NVM array accesses. For example, the NVM bitcell array 213 can be implemented as a FLASH memory, wherein the NVM controller will convert write requests for specific addresses of memory into one or more program and erase requests consistent with FLASH memory operation.

Erase requests provided to the NVM controller module 220 are handled by the erase control module 226. In addition to preventing erase requests to the OTP block 260, the erase control module 226 determines whether to allow erase access to the shadow block 250 or to prevent erase access to the shadow block 250 based upon the state of PCK 61. According to a particular embodiment, the permanent censorship key (PCK) 61 is a multiple-bit storage location that is capable of being programmed but not erased. Responsive to the PCK 61 having one or more of the multiple bit storage location programmed, the erase control module 226 will prevent erase requests to the shadow block 250. Therefore, it is not possible for the shadow block 250 to be erased once one or more bits of PCK 61 have been programmed, irrespective of the value programmed at PCK 61. Similarly, the program control module 227 will prevent any program requests from programming locations of the shadow block 250 if one or more bits of PCK 261 storage location have been programmed.

Therefore, by implementing the PCK 61 storage location in the OTP memory 260, the manufacturer of a system using IC 100 can program one or more bits of PCK 61 to permanently preserve the censorship mode of the device by preventing modification of the shadow block 250. Note that for OTP NVM locations, once one more bits are programmed, there is no way to change any of the bits back to erased state and the bit(s) will be left at programmed state permanently. Thus, hacker code embedded in the IC that runs from internal resources can be prevented from erasing and programming the shadow block 250 to maliciously unsecure the device. How the NVM controller module 220 implements this security feature will be better understood with reference to the flow diagrams of FIGS. 3 through 5.

Figure 3:
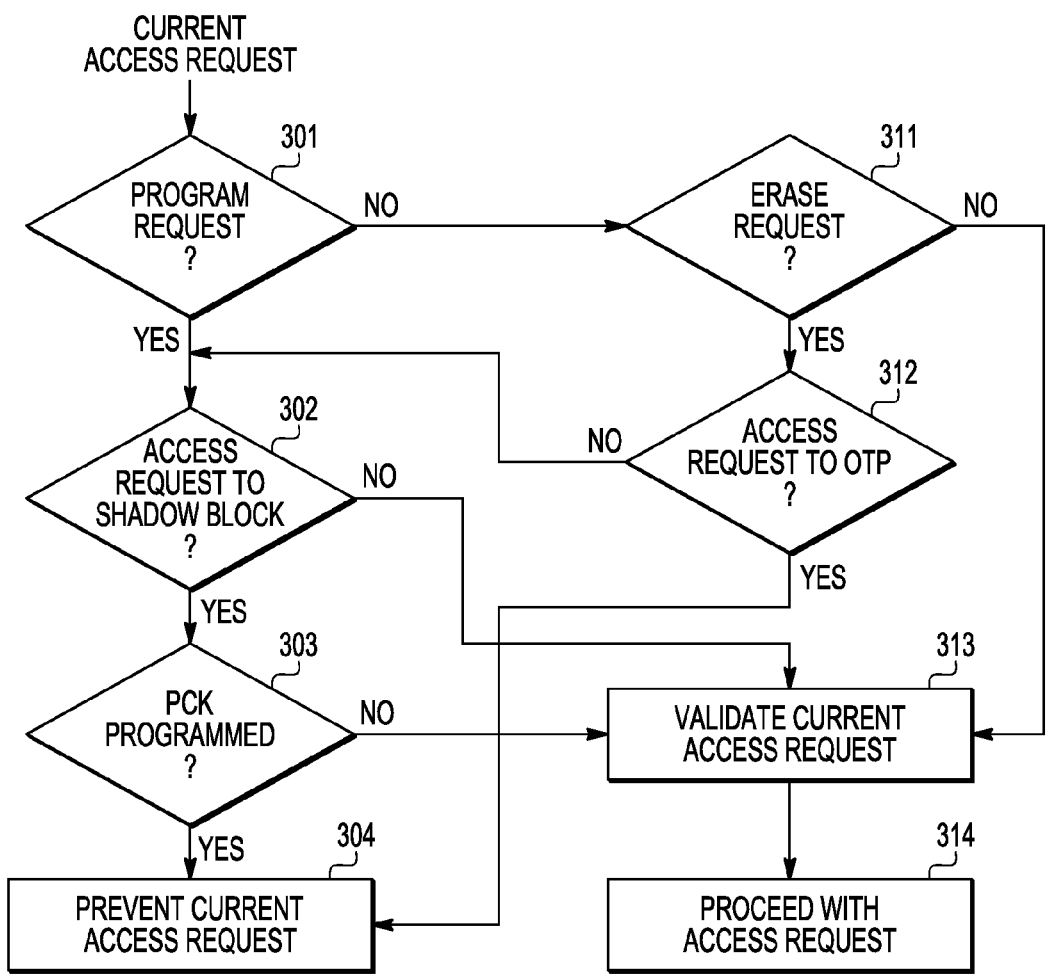
FIG. 3 illustrates a flow diagram in accordance with a specific embodiment of the present disclosure.

FIG. 3 illustrates a flow diagram of a particular embodiment of the present disclosure. A current access request to non-volatile memory located in NVM array 213 is received at block 301. The current access request may have already been validated with respect to one or more specific conditions. For example, in one embodiment the current access request provided to block 301 occurs subsequent to the current access request being validated as part of the censorship criteria, e.g. after being validated by censorship control 230, as will be further described with reference to FIG. 4. In an alternate embodiment, the current access request provided to block 301 can occur prior to the current access request being validated as part of the censorship criteria, as will be further described with reference to FIG. 5. Therefore, depending upon a particular implementation, the current access request as received at block 301 may have already been validated by the censorship control module 230 with respect to the ability of a requesting device to access the particular memory location based upon the values CCW and SAK as described previously.

At block 301, it is determined whether the current access request is a program request. If so flow proceeds to block 302 for handling, otherwise flow proceeds to block 311.

At block 302, it is determined whether the program request is to a particular memory location or region, such as to the shadow block 250 of NVM bitcell array 213. In accordance with the present disclosure, the term "shadow block" refers to a location or region of NVM memory that is to store information used by a censorship control 230 and NVM controller 220 to determine the manner in which some or all of the NVM is configured. For example, the shadow block can be a portion of the NVM where the CCW 51 and SAK 52 are stored, as described previously. Flow proceeds to block 303 from block 302 if it is determined that the program request is to the shadow block. Otherwise, flow proceeds to block 313 where the current program request is validated and allowed to continue normally.

At block 303, it is determined whether an OTP location that stores a permanent censorship key (PCK) has been programmed. In one embodiment, the OTP location where PCK is stored comprises multiple memory cells, and if any one or more of the multiple memory cells has been programmed, irrespective as to the actual PCK value, it is determined at block 303 that PCK has been programmed and flow proceeds to block 304, otherwise flow proceeds to block 313 where the current program request is allowed to proceed.

At block 304, the NVM controller prevents the current program access from occurring. By preventing a program access from occurring, the contents of the shadow memory cannot be altered, thereby ensuring that any security information, such as information stored at CCW 51 and SAK 52, is not altered by an otherwise valid request. For example, a request from an internal resource, such as from processor 111, that is not subject to being censored in response to censorship being enabled, as described above, would be prevented from programming information to at least CCW or SAK. By allowing any one or more programmed bits of the PCK to prevent access to the shadow memory, irrespective of the value of the PCK, extra protection is provided by programming all bits of PCK to ensure the shadow memory cannot be programmed.

Referring back to block 301, flow proceeds to block 311 if the current access request is not a program request. At block 311, it is determined whether the access request is an erase request. If so, flow proceeds to block 312, otherwise the current access request is neither a program request nor an erase request, e.g., a read access request, and flow proceeds to block 313 where the access request is allowed to proceed, e.g., validated.

At block 312, the erase module 226 determines whether the erase request is to an OTP block, such as OTP block 260 of the NVM array, which contains the PCK. If so, flow proceeds to block 304 where the erase request of an OTP location is prevented, otherwise flow proceeds to block 302.

At block 302, it is determined whether the current erase request is to a particular memory location or region, such as to the shadow block 250 of NVM bitcell array 213. Flow proceeds to block 303 from block 302 if it is determined that the current erase request is to the shadow block. Otherwise, flow proceeds to block 313 where the current erase request is validated and continues normally at block 314.

At block 303, it is determined whether PCK has been programmed as previously described. If so, flow proceeds to block 304 and the current erase request is prevented, otherwise flow proceeds to block 313 in response to PCK having not been programmed and the current program request is allowed to proceed.

Flow proceeds from validation block 313 to block 314, where the present access request, which has been further validated, continues to be handled in a normal manner. It will be appreciated that as part of a normal access operation the current access request can be performed at block 314 with or without further validation based upon other criteria. This will be better understood with reference to FIGS. 4 and 5.

Figure 4:
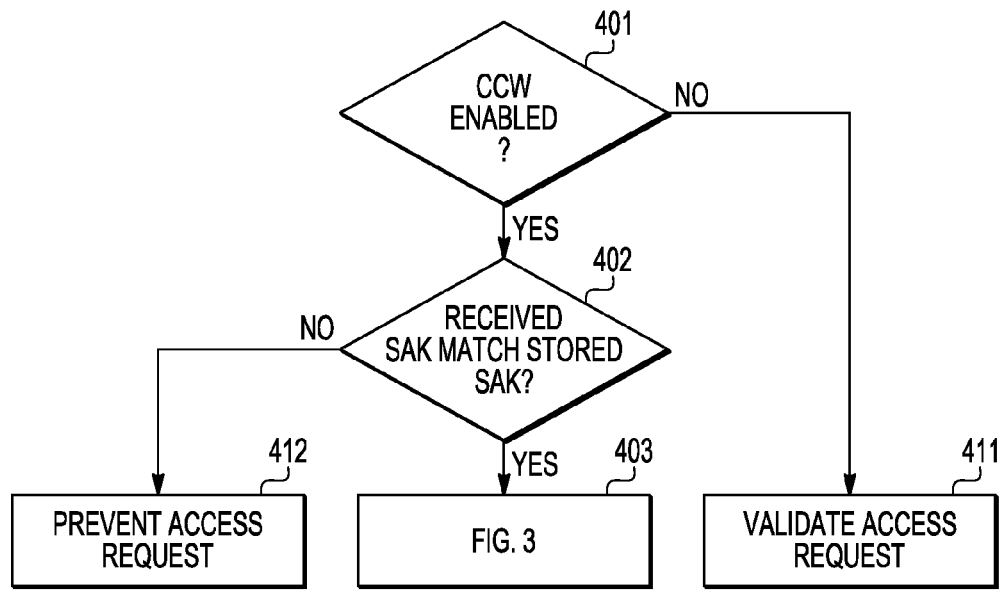
FIG. 4 illustrates a specific implementation of a flow diagram that includes the flow diagram of FIG. 3.

FIG. 4 illustrates a flow diagram of a particular embodiment of the present disclosure that illustrates validating the current access request with respect to censorship prior to being provided to block 301 of FIG. 3. In particular, the access request is received at block 401 where it is determined whether an indicator, such as the value stored at CCW 51, enables censorship, wherein access requests to the target memory location need to be validated by a secure access key (SAK). If so, the device is in censorship mode and flow proceeds to block 402, otherwise flow proceeds to block 411 where the access request is validated and allowed to continue normally.

At block 402, it is determined whether a password provided by the user matches the SAK. If so, censorship mode has authenticated the present access request and flow proceeds to block 403, which represents the flow of FIG. 3 for further validation. Otherwise, flow proceeds to block 412 where the access request is prevented. Thus, in the particular embodiment of FIG. 4, program and erase requests to shadow memory are validated or prevented based upon the state of (PCK) only when the censorship control word (CCW) is asserted and the secure access key (SAK) is validated.

Figure 5:
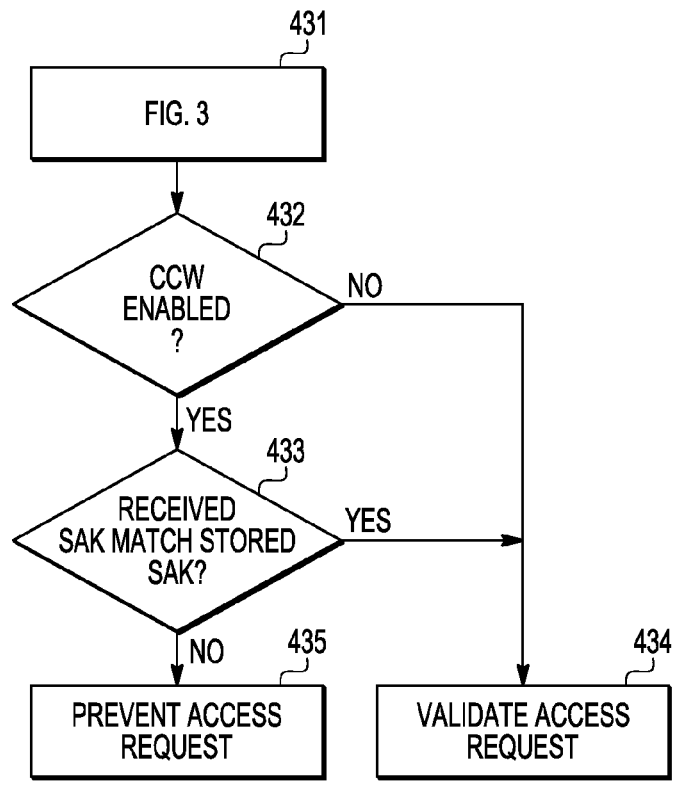
FIG. 5 illustrates a specific implementation of a flow diagram that includes the flow diagram of FIG. 3.

FIG. 5 illustrates a flow diagram of a particular embodiment of the present disclosure that includes the censorship control module 230 validating the current access request with respect to censorship after first validating the current access request based upon the flow of FIG. 3. In particular, access requests are initially handled a block 431, which corresponds to the flow of FIG. 3, and the continued processing of block 314 of FIG. 3 is represented in FIG. 5 by blocks 432 through 435. Therefore, access requests that are validated at block 313 of FIG. 3 are provided to block 432 of FIG. 5 where it is determined whether censorship is enabled, e.g., CCW is programmed to a censorship enable value. If so the device is in censorship mode and flow proceeds to block 433, otherwise flow proceeds to block 434 where the access request is validated and allowed to continue normally. At block 433, it is determined whether a received access key matches a stored SAK. If so, censorship mode has validated the present access request and flow proceeds to block 434 for continued processing of the access request. Thus, in the particular embodiment of FIG. 5, program and erase requests to shadow memory are validated or prevented based upon the state of the permanent censorship key (PCK) regardless as to the state of the censorship control word (CCW) and the secure access key (SAK).

Typically, for ensuring the security of the code/data in NVM, it is recommended that one first erase shadow block and program the CCW and SAK in shadow block to enable the censorship, and then program all bits of the permanent censorship key (PCK) location in OTP area to programmed state to prevent shadow block from being modified by any resources to enable the permanent censorship.

In a first aspect, a method can include receiving, at a memory controller of an integrated circuit, a first access request to access a location of a set of memory locations, the set of memory locations including a first subset of memory locations and a one-time programmable (OTP) subset of memory locations, the first subset including a first control indicator at a first memory location, the OTP subset including a second control indicator comprising a plurality of bits at a second memory location, wherein the first control indicator is used by the memory controller to determine whether access requests from a first resource of the integrated circuit to access the set of memory locations need to be authenticated. The method can also include, in response to the first access request being a request to access the first subset, determining if a condition has been met, and meeting the condition includes determining that at least a predetermined a number of the plurality of bits of the second control indicator have been programmed irrespective of a value of the second control indicator. The method can further include preventing the first access request to the first subset in response to determining that at least the predetermined number of the plurality of bits have been programmed, otherwise, validating the first access to the first subset request in response to determining that less than the predetermined number of the plurality of bits have not been programmed.

In one embodiment of the first aspect, the first subset of memory is a programmable/erasable non-volatile memory (NVM) and the first access request is a program request. In another embodiment, the first subset of memories is a programmable/erasable non-volatile memory (NVM) and the first access request is an erase request. In a particular embodiment, the first subset is a programmable/erasable non-volatile memory (NVM) that includes a first portion that includes the first control indicator and a second portion, and wherein meeting the condition further includes determining that the first access request is to the first portion, and determining that the condition has not been met if the first access request is to the second portion.

In still another embodiment of the first aspect, the OTP subset of memory and the first subset of memory reside in a common memory array that is non-volatile memory (NVM), and further comprising preventing the first access request in response to determining the first access request is an erase request to the OTP subset. In a further embodiment, the first subset of memory includes a first portion that includes the first control indicator and a second portion, and meeting the condition further includes determining that the first access request is to the first portion, and determining that the condition has not been met if the first access request is to the second portion. In an even further embodiment, in response to the first access request being a program request to the OTP subset of memory the first access request is validated irrespective as to whether the condition has been met.

In another embodiment of the first aspect, the first access request is from a second resource of the integrated circuit, and the first control indicator is not used by the memory controller to determine whether access requests from the second resource need to be authenticated. In still another embodiment, the second resource is a processor core of the integrated circuit. In a further embodiment, the first access request is from the first resource of the integrated circuit, has been authenticated by the memory controller responsive to the first control indicator indicating that access requests from the first resource are to be authenticated.

In a second aspect, an integrated circuit device can include a first storage region that is an electrically programmable/erasable non-volatile memory, a second storage region that is an electrically programmable, but not electrically erasable, non-volatile memory, the second region comprising a multi-bit storage location to store a multi-bit control value, a storage location to store a first control indicator, and a first resource that, responsive to a predetermined value of the first control indicator, needs to be authenticated to access a set of storage regions of the integrated circuit device. The device can further include a second resource that can access the set of storage regions irrespective the state of the first control indicator, and a memory controller to prevent an access request to a region containing the first control indicator by the any resource responsive to any bit location of the multi-bit storage location having a programmed state.

In one embodiment of the second aspect, the memory controller is to prevent the access request when the access request is an erase access. In another embodiment, the memory controller is to prevent the access request when the access request is a program access. In still another embodiment, the storage location is in a sub-region of the first storage region and the memory controller is to prevent the access request when the access request is to the sub-region.

In a further embodiment of the second aspect, the device includes a memory array coupled to a column logic and to a row decoder, the memory array comprising the first storage region and the second storage region, wherein the memory controller prevents erase access requests to the second storage region.

In a third aspect, the method can include receiving, at a memory controller, an erase request, from a requesting device, that is valid with respect to the requesting device and with respect to an address to be erased by the erase request, and validating the erase request in response to determining that every bit of an OTP storage location having a plurality of bits is erased, or preventing the erase request from erasing the storage location in response to determining any one or more bits of the OTP storage location has been programmed.

In one embodiment of the third aspect, the method includes determining if an access request is a read request or a program a request or the erase request, and in response to the access request being the erase or program request implementing the validating or the preventing, otherwise in response to the access request being the read request validating the read request irrespective a state of the OTP storage location. E.g., reading and programming a location of the OTP does not depend upon the state of the OTP location (PCK). In another embodiment, the erase request is to a one-time programmable (OTP) non-volatile memory (NVM) that stores a value used by the memory controller to determine if the request is validated.

In a further embodiment of the third aspect, the erase or program request is to a programmable and erasable non-volatile memory (NVM) that stores a value used by the memory controller to determine if the requesting device needs to be authenticated to access the NVM. In an even further embodiment, the storage location stores a value that is used to validate the requesting device irrespective of the address being accessed. AC50578TS claim prose In a fourth aspect, a method can include asserting a first indicator at a first non-volatile memory storage location of an integrated circuit to place a memory of the integrated circuit in a censorship mode of operation, wherein, as a result of being in censorship mode, access requests from a debug module of the integrated circuit to access the memory need to be authenticated, while access requests from an instruction-based processor to access the memory of the integrated circuit do not need to be authenticated. The method can also include asserting a second indicator at a first one-time programmable (OTP) non-volatile memory location to place the memory in a permanent censorship mode of operation, wherein as a result of being in permanent censorship mode instructions executed at the instruction-based processor are prevented from erasing the first storage location.

In one embodiment of the fourth aspect, the second indicator includes a plurality of bits, and asserting the second indicator includes programming at least a predetermined number of the plurality of bits irrespective of a value of the second indicator. In another embodiment, the predetermined number is one. In a particular embodiment, the memory includes a plurality of non-volatile memory blocks that are programmable and erasable, including a first memory block that includes the first storage location. In a further embodiment, the method includes asserting the second indicator occurs after asserting the first indicator, and erasing the first memory block prior to asserting the first indicator.

In another embodiment of the fourth aspect, the method includes, as a result of being in permanent censorship mode, the instructions executed at the instruction-based processor are prevented from erasing any of a plurality of storage locations of the first memory block. In a further embodiment, a second memory block of the plurality of non-volatile memory blocks can be erased and programmed by instructions executed by the instruction-based processor when the memory is in permanent censorship mode. In an even further embodiment, access requests from the debug module of the integrated circuit to access the memory need to be authenticated based upon a third indicator that is stored at the first memory block. In still another embodiment, the plurality of programmable and erasable non-volatile memory blocks and the OTP non-volatile memory block are located in the same bit cell array.

In a still further embodiment of the fourth aspect, as the result of being in permanent censorship mode the instruction-based processor are prevented from programming the first storage location. In a particular embodiment, the first one-time programmable (OTP) memory location is one of a plurality of OTP memory locations, and wherein the plurality of OTP memory locations can be programmed when the memory is in permanent censorship mode of operation. In a more particular embodiment, the method includes preventing erase accesses of a plurality of OTP memory locations that include the first OTP location.

In a fifth aspect, the device can include a debug module, an instruction-based processor, a first memory region that includes a first storage location to store a first indicator, and a second storage location to store a second indicator, the second storage location being a one-time programmable storage location. The device also includes a memory controller coupled to the first memory region, to the second storage location, to the debug module, and to the instruction-based processor, a censorship control module of the memory controller to require, in response to the first indicator being asserted, authentication of memory access requests to the first memory region by the debug module, and to not require, in response to the first indicator being asserted, the authentication of memory access requests to the first memory region by the instruction-based data processor, and an erase module of the of the memory controller to prevent, in response to the second indicator being asserted, the first storage location from being erased.

In one embodiment of the fifth aspect, the second storage location includes a plurality of bits, and the erase module is to determine the second indictor is asserted in response to a predetermined number of the plurality of bits being programmed, irrespective of a value of the second indicator. In another embodiment, the first memory region includes a non-volatile memory region that includes the first storage location, the non-volatile memory region being programmable and erasable. In a further embodiment, the non-volatile memory region includes a plurality of memory blocks including a first memory block and a second memory block, the first memory block comprising the first storage location; and, in response to the second indicator being set, the erase module to prevent any storage location of the first memory block from being erased, and, in response to the second indicator being asserted, not preventing any storage location of the second memory block from being erased.

In a sixth aspect, the method can include receiving, at a memory controller, an erase or program request from a requesting device; and allowing the erase or program request to proceed in response to determining that every bit of an OTP storage location having a plurality of bits is erased, or otherwise preventing the erase or program request from proceeding in response to determining any one or more bits of the OTP storage location has been programmed.

In one embodiment of the sixth aspect, the erase or program request is from a first resource to a first memory location that stores a first indicator that indicates whether access requests by a debug module to the first memory need to be authenticated. In another embodiment, the requesting device is an instruction-based processor.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, the present embodiment has been described assuming that the non-volatile-memory (NVM) to be FLASH memory in which the minimum erasable unit is a block. However, it will be appreciated that it can also apply to other type of NVMs such as Electrically Erasable and Programmable Read Only Memory (EEPROM) in which the minimum erasable unit can be as small as a word. It will be appreciated, that the various sub-modules of the NVM controller module 220 can be implemented using shared or dedicated logic. In particular the various modules can be implemented using software, firmware, or state machine logic to implement the various functions as described herein.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   erasing a first memory block, wherein the first memory block includes a first non-volatile memory storage location and a second non-volatile memory storage location;
   asserting a first indicator at the first non-volatile memory storage location of an integrated circuit to place a memory of the integrated circuit in a censorship mode of operation, wherein, as a result of being in the censorship mode, access requests from a debug module of the integrated circuit to access the memory need to be authenticated, while access requests from an instruction-based processor to access the memory of the integrated circuit do not need to be authenticated, wherein the erasing the first memory block occurs prior to the asserting the first indicator; and
   asserting a second indicator at a first one-time programmable (OTP) non-volatile memory location to place the memory in a permanent censorship mode of operation, wherein as a result of being in the permanent censorship mode instructions executed at the instruction-based processor are prevented from erasing the first storage location, wherein asserting the second indicator occurs after asserting the first indicator, wherein the second indicator comprises a plurality of bits, and asserting the second indicator comprises programming at least a predetermined number of the plurality of bits irrespective of a value of the second indicator; and
   authenticating a first access request of the access requests from the debug module based on a secure access key stored at the second non-volatile memory storage location of the integrated circuit, wherein as a result of being in the permanent censorship mode the instructions executed at the instruction-based processor are prevented from erasing the second storage location.

2. The method of claim 1, wherein the predetermined number is one.

3. The method of claim 1 wherein the memory comprises a plurality of non-volatile memory blocks that are programmable and erasable.

4. The method of claim 3, wherein as a result of being in permanent censorship mode, the instructions executed at the instruction-based processor are prevented from erasing any of a plurality of storage locations of the first memory block.

5. The method of claim 3, wherein a second memory block of the plurality of non-volatile memory blocks can be erased and programmed by instructions executed by the instruction-based processor when the memory is in permanent censorship mode.

6. The method of claim 3, wherein access requests from the debug module of the integrated circuit to access the memory need to be authenticated based upon a third indicator that is stored at the first memory block.

7. The method of claim 3, wherein the plurality of programmable and erasable non-volatile memory blocks and the OTP non-volatile memory block are located in the same bit cell array.

8. The method of claim 1, wherein as the result of being in permanent censorship mode the instruction-based processor are prevented from programming the first storage location.

9. The method of claim 8, wherein the first one-time programmable (OTP) memory location is one of a plurality of OTP memory locations, and wherein the plurality of OTP memory locations can be programmed when the memory is in permanent censorship mode of operation.

10. The method of claim 1, wherein the memory includes the first storage location.

11. The method of claim 1, further comprising preventing erase accesses of a plurality of OTP memory locations that include the first OTP location.

12. A device comprising:
    a debug module;
    an instruction-based processor;
    a first memory region that includes a first storage location to store a first indicator and a second storage location to store a secure access key;
    a second storage location to store a second indicator, the second storage location being a one-time programmable storage location;
    a memory controller coupled to the first memory region, to the second storage location, to the debug module, and to the instruction-based processor,
    a censorship control module of the memory controller to require, in response to the first indicator being asserted, authentication of memory access requests to the first memory region by the debug module, and to not require, in response to the first indicator being asserted, the authentication of memory access requests to the first memory region by the instruction-based processor, wherein the authentication of a first access request of the memory access requests to the first memory region by the debug module is based on a secure access key stored at the second storage location, and
    an erase module of the of the memory controller to cause, prior to the first indicator being asserted, erasure of the first storage location, and to prevent, in response to the second indicator being asserted, the first storage location from being erased, wherein the second storage location comprises a plurality of bits, and the erase module is to determine the second indicator is asserted in response to a predetermined number of the plurality of bits being programmed, irrespective of a value of the second indicator, wherein as a result of the second indicator being asserted the instruction-based processor is prevented from erasing the any storage location of the first memory region.

13. The device of claim 12, wherein the first memory region comprises a non-volatile memory region that includes the first storage location, the non-volatile memory region being programmable and erasable.

14. The device of claim 13, wherein the non-volatile memory region includes a plurality of memory blocks including a first memory block and a second memory block, the first memory block comprising the first storage location; and, in response to the second indicator being set, the erase module to prevent any storage location of the first memory block from being erased, and, in response to the second indicator being asserted, not preventing any storage location of the second memory block from being erased.

15. The method of claim 1 wherein the authenticating the first access request of the access requests from the debug module based on the secure access key is performed during an initial boot routine of the integrated circuit.

16. The method of claim 1 wherein the authenticating the first access request of the access requests from the debug module based on the secure access key is performed based on a password provided with each individual access request.

17. The device of claim 12 wherein the authentication of the first access request of the memory access requests to the first memory region by the debug module are based on the secure access key is performed during a boot routine of the device.

* * * * *